(12) United States Patent
Kim

(10) Patent No.: US 9,713,847 B2
(45) Date of Patent: Jul. 25, 2017

(54) TURN BROACH MACHINE

(71) Applicant: Hyundai Motor Company, Seoul (KR)

(72) Inventor: Tae Jin Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 475 days.

(21) Appl. No.: 14/178,020

(22) Filed: Feb. 11, 2014

(65) Prior Publication Data

US 2015/0147126 A1 May 28, 2015

(30) Foreign Application Priority Data

Nov. 26, 2013 (KR) ........................ 10-2013-0144722

(51) Int. Cl.
*B23C 5/08* (2006.01)
*B23C 5/24* (2006.01)
*B23D 43/06* (2006.01)

(52) U.S. Cl.
CPC .............. *B23C 5/08* (2013.01); *B23C 5/2417* (2013.01); *B23D 43/06* (2013.01); *B23C 2210/244* (2013.01); *B23D 2043/063* (2013.01); *Y10T 407/1628* (2015.01)

(58) Field of Classification Search
CPC ........ B23C 2200/0483; B23C 2210/24; B23C 2210/503; B23C 3/06; B23C 5/207; B23C 5/08; B23C 5/12; B23C 5/2417; B23C 2210/244; B23D 2043/063
USPC ......................................... 407/12, 15, 16, 25
See application file for complete search history.

(56) References Cited

U.S. PATENT DOCUMENTS

| 5,030,049 A | 7/1991 | Voss | |
|---|---|---|---|
| 5,158,400 A * | 10/1992 | Skinner | B23F 21/243 407/12 |
| 2007/0047863 A1 | 3/2007 | Yasumura et al. | |
| 2010/0104382 A1 | 4/2010 | Heinloth et al. | |
| 2012/0076599 A1 * | 3/2012 | Heinloth | B23C 3/06 409/131 |

FOREIGN PATENT DOCUMENTS

| JP | S57-132921 A | 8/1982 |
|---|---|---|
| JP | 2-145207 A | 6/1990 |
| JP | H04-35809 A | 2/1992 |
| JP | 5-131321 A | 5/1993 |
| JP | 5-228724 A | 9/1993 |
| JP | 2002-283132 A | 10/2002 |
| JP | 2010-521328 A | 6/2010 |

\* cited by examiner

*Primary Examiner* — Sara Addisu
(74) *Attorney, Agent, or Firm* — Morgan Lewis & Bockius LLP

(57) ABSTRACT

A turn broach machine may include a machining member machining a target to be cut; and an adaptor which is provided under the machining member, supports the machining member, and adjusts a position of the machining member. At the time of adjusting a position of a segment of the machining member from a plate provided in an adapter, the segment moves on an adjusting plate that is mechanically defined, such that work accuracy may be improved to increase marketability and a work time may be decreased to improve work convenience and productivity.

12 Claims, 5 Drawing Sheets

FIG. 2
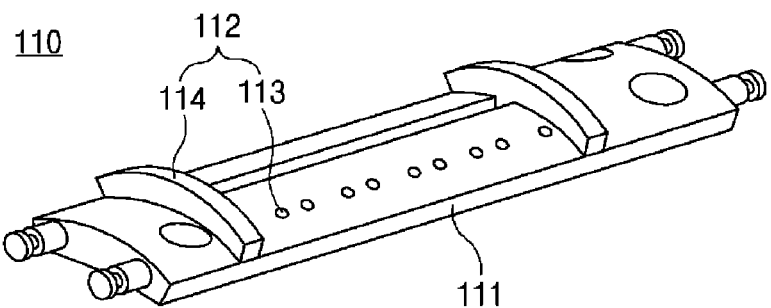
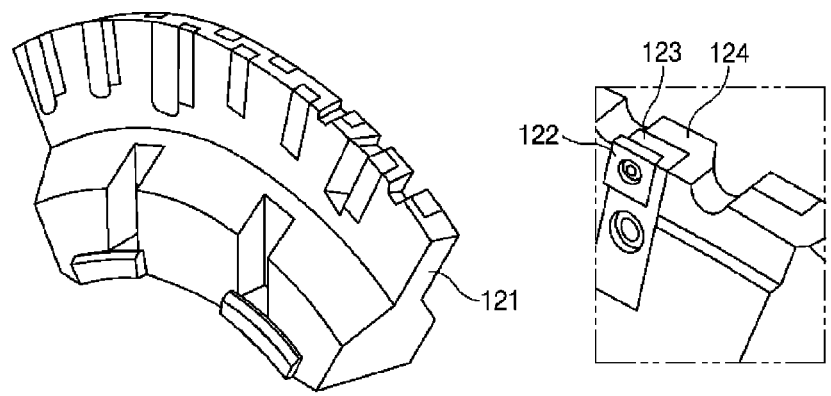
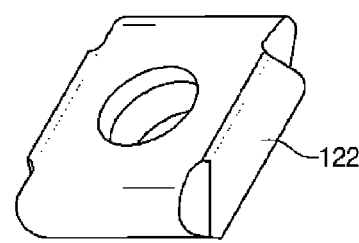
FIG. 3A
FIG. 3B
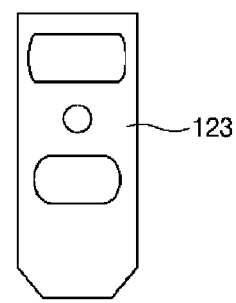
FIG. 3C
FIG. 3D

TURN BROACH MACHINE

CROSS-REFERENCE TO RELATED APPLICATION

The present application claims priority of Korean Patent Application Number 10-2013-0144722 filed Nov. 26, 2013, the entire contents of which application is incorporated herein for all purposes by this reference.

BACKGROUND OF INVENTION

Field of Invention

The present invention relates to a turn broach machine, and more particularly, to a turn broach machine capable of enhancing coupling force between a plate and segments and adjusting positions of the segments from the plate.

Description of Related Art

Generally, a crank for an engine is a single product manufactured by components such as a crack throw, a pin, and an end journal. Therefore, the crank for an engine should be machined in consideration of all of deformation due to heat, the radially assembled crank throw, deformation of a shape of the crack throw, and the like.

In order to correct run out and deflection values of the crank, a journal machining device such as a turn broach is used.

However, in a turn broach device according to the related art, at the time of adjusting segments, the entire turn broach device should be separated from an equipment, the segments should be separated from a plate, and a segment interval should be adjusted. In addition, after the segment interval is adjusted, reassembling should be performed, which is inconvenient. Further, in the case in which it is difficult to adjust the interval, a new turn broach device should be inevitably manufactured, such that a work time is increased.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention has been made to solve the above-mentioned problems occurring in the prior art while advantages achieved by the prior art are maintained intact.

Various aspects of the present invention provide for a turn broach machine capable of enhancing coupling force between a plate and a segment and adjusting a position of the segment from the plate.

Various aspects of the present invention provide for a turn broach machine including: a machining member machining a target to be cut; and an adaptor provided under the machining member, supporting the machining member, and adjusting a position of the machining member.

The adaptor may include: a plate supporting the machining member; and an adjusting part provided on the plate and adjusting the position of the machining member.

The adjusting part may include: an adjusting plate provided on the plate; and a stopper provided on the plate and limiting movement of the machining member.

The machining member may include: segments provided on the adjusting plate of the adjusting part; and inserts provided on the segments and machining the target to be cut.

The machining member may further include insert cores inserted between the segments and the inserts and adjusting positions of the inserts.

The machining member may further include cartridges mounting the inserts on the segments.

The adjusting plate of the plate may have a serration formed on an upper surface thereof.

A lower portion of the segment may have a shape corresponding to that of the serration formed on the upper surface of the adjusting plate of the plate.

The segments may be coupled to an upper portion of the adjusting plate by fixing bolts.

One end of the adjusting plate may be provided with a bearing moving along the plate and the other end thereof is provided with an adjusting bolt screwed thereto.

The other end of the adjusting plate may be provided with an adjusting hole having a screw thread formed on an inner peripheral surface thereof to allow the adjusting bolt to be inserted thereinto so as to ascend and descend.

The adjusting plate may have a trapezoidal shape in which a lower surface thereof is short.

The plate may have a first support provided on an upper portion of the center thereof, the adjusting plate may have a second support provided on a lower portion of the center thereof, and the first and second supports may have a bearing additionally provided therebetween.

Inclined surfaces corresponding to each other may be formed between the first and second supports and be formed in the same direction as that of the inclined surface formed on one end of the adjusting plate.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view showing an adaptor of the exemplary turn broach machine according to the present invention;

FIG. 3A, FIG. 3B, FIG. 3C and FIG. 3D are views showing a machining member of the exemplary turn broach machine according to the present invention;

DETAILED DESCRIPTION

Figure 1A:
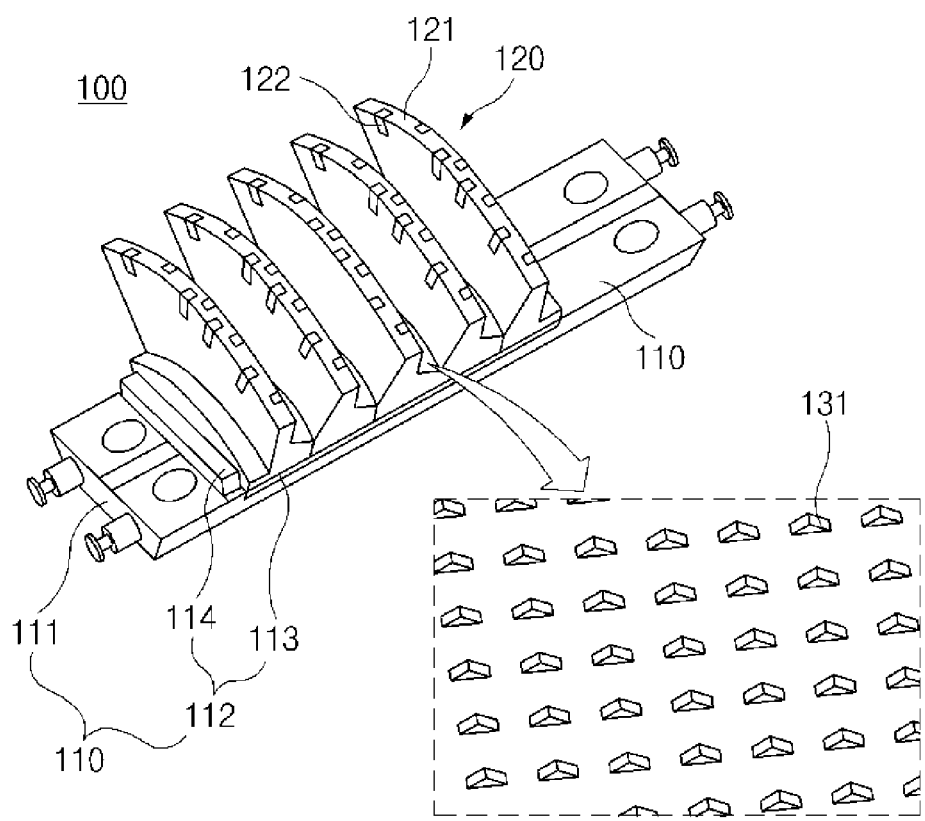
FIG. 1A and FIG. 1B are views showing an exemplary turn broach machine according to the present invention.
Figure 1B:
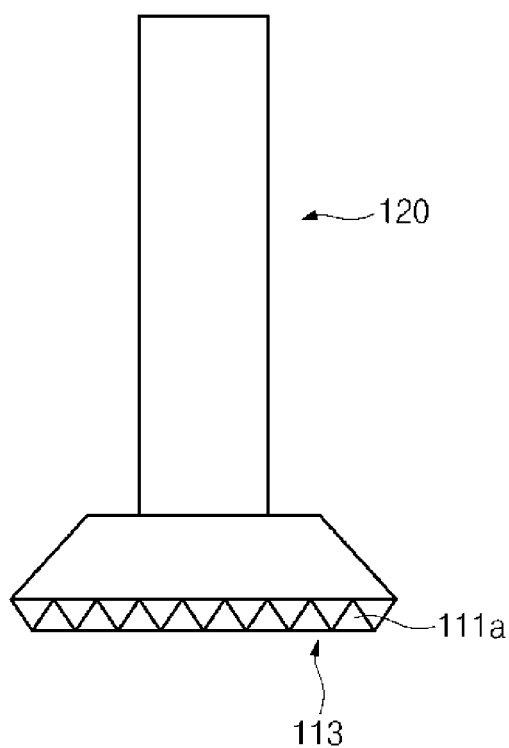
Figure 4:
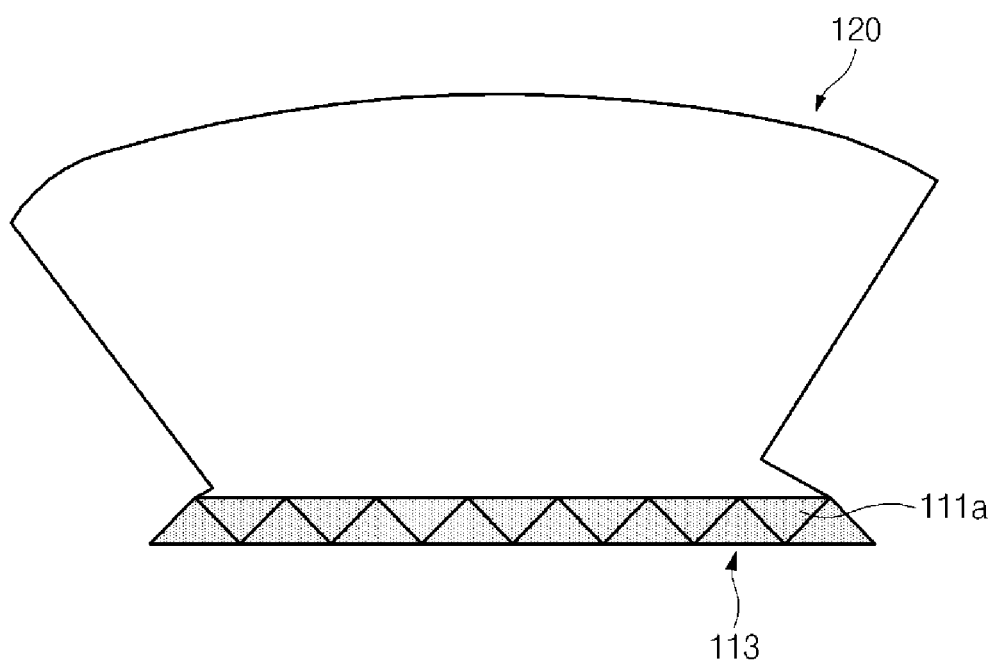
FIG. 4 is a view showing a segment of the exemplary turn broach machine according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A turn broach machine according to various embodiments of the present invention is configured to include a machining member 120 machining a target to be cut (e.g., cutting material from a workpiece) and an adaptor 110 provided under the machining member 120 and supporting the machining member 120 while adjusting a position of the machining member 120, as shown in FIGS. 1A to 7.

As shown in FIGS. 1A and 1B and 3A to 3D, the adaptor 110 includes a plate 111 supporting the machining member 120 and having a rectangular plate shape and an adjusting part 112 provided on the plate 111 and adjusting the position of the machining member 120.

Here, the adjusting part 112 includes an adjusting plate 113 positioned on the plate 111 and movable and a stopper 114 provided on the plate 111 and limiting movement of the machining member 120.

In various embodiments, it may be preferable that an adjusting screw coupling the plate 111 and the adjusting plate 113 to each other is provided to prevent the adjusting plate 113 from being separated from the plate 111 in spite of moving on the plate 111.

As shown in FIGS. 2 to 3D, the machining member 120 includes segments 121 provided on the adjusting plate 113 of the adjusting part 112 and inserts 122 (See FIGS. 3B and 3C) provided on the segments 121 and machining the target to be cut (journal part of a crank).

In various embodiments, it may be preferable that the machining member 120 further includes insert cores 123 (See FIGS. 3B and 3D) inserted between the segments 121 and the inserts 122 and adjusting positions of the inserts 122 and cartridges 124 (See FIG. 3B) mounting the inserts 122 on the segments 121.

Meanwhile, the adjusting plate 113 of the plate 111 may have a serration 111a formed on an upper surface thereof to adjust the positions of the segments 121 in a horizontal direction.

In addition, a lower portion of the segment 121 may have a shape corresponding to that of the serration 111a formed on the upper surface of the adjusting plate 113 of the plate 111 to allow the segment 121 to finely move the adjusting plate 113 according to the shape of the serration 111a, thereby precisely and accurately adjusting the segment 121.

Figure 5:
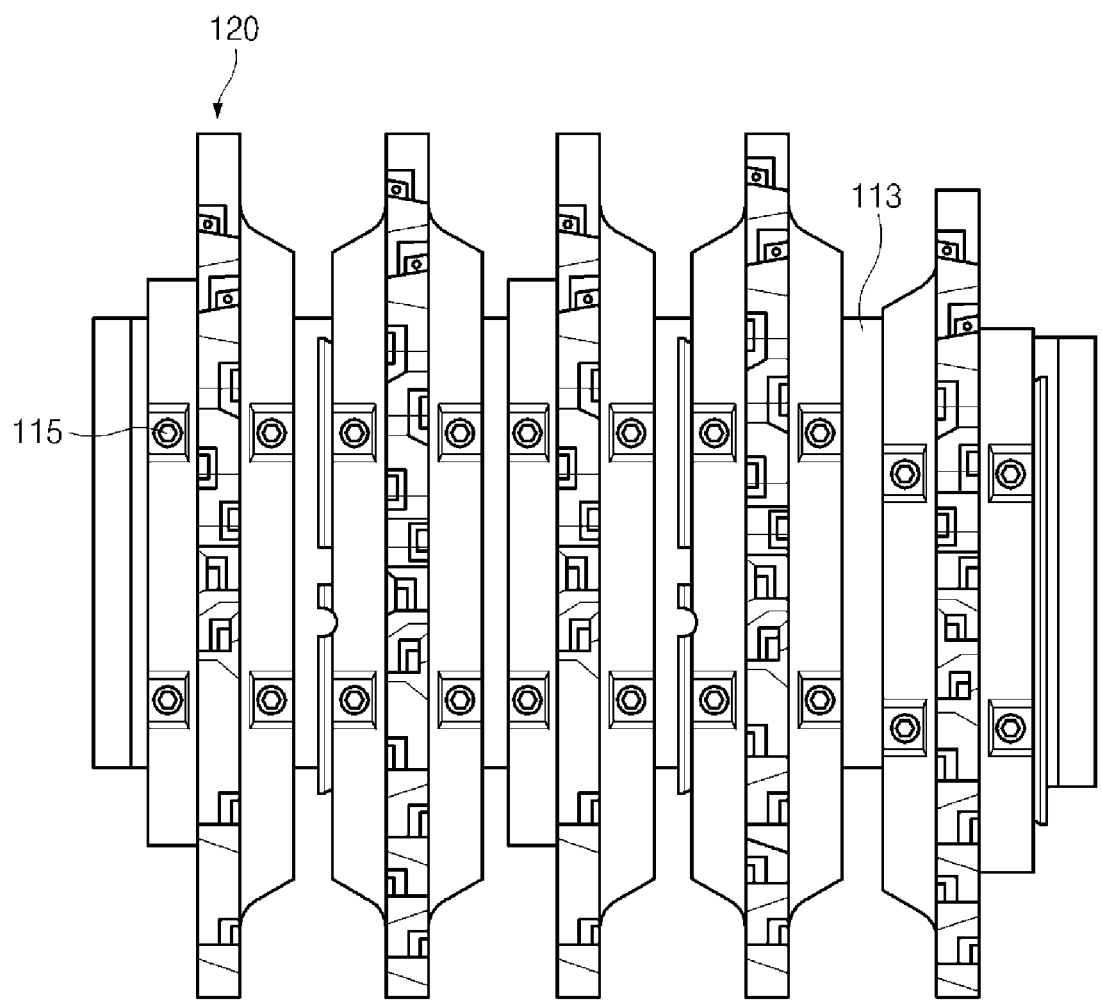
FIG. 5 is a plan view showing the exemplary turn broach machine according to the present invention.

In various embodiments, it may be preferable that the segments 121 are fixed to the adjusting plate 113 of the plate 111 by fixing bolts 115 to improve coupling force between the segments 121 and the plate 111, as shown in FIG. 5.

Figure 6:
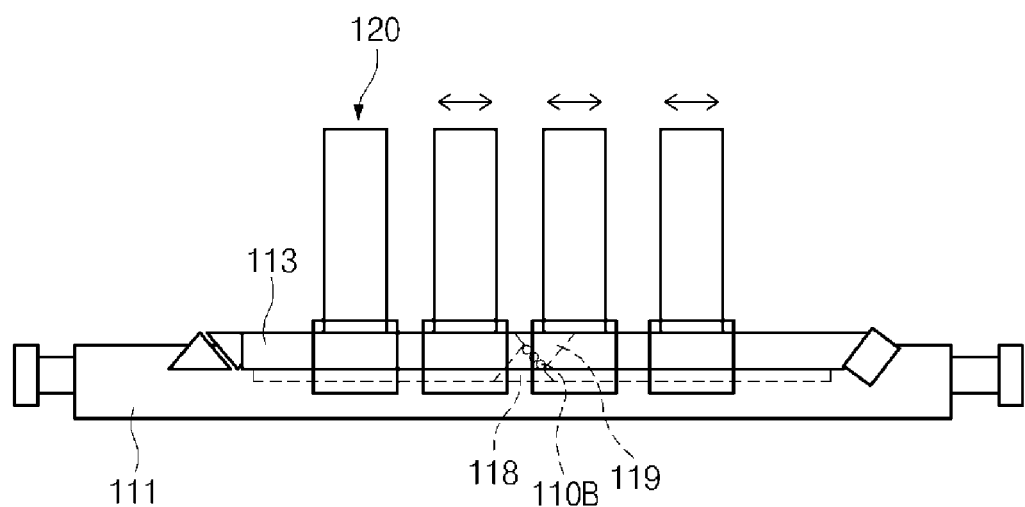
FIG. 6 is a side view showing the exemplary turn broach machine according to the present invention.
Figure 7:
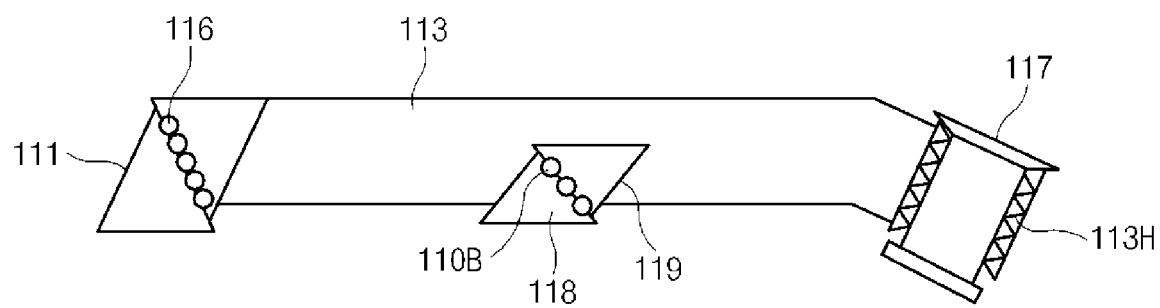
FIG. 7 is a cross-sectional view showing an adjusting plate of the exemplary turn broach machine according to the present invention.

As shown in FIGS. 6 and 7, the adjusting plate 113 has a trapezoidal shape in which a lower surface thereof is shorter than the upper plate thereof and an upper portion of the plate 111 has a shape corresponding to that of the adjusting plate 113, such that inclined surfaces are formed on both ends of the adjusting plate 113 and the plate 111, respectively.

Here, one end of the adjusting plate 113 is provided with a bearing 116 moving along the inclined surface of the upper portion of the plate 111 and the other end thereof is provided with an adjusting bolt 117 screwed thereto.

Here, the other end of the adjusting plate 113 is provided with an adjusting hole 113H having a screw thread formed on an inner peripheral surface thereof to allow the adjusting bolt 117 to be inserted thereinto so as to ascend and descend.

That is, in various embodiments of the present invention, when the adjusting bolt 117 provided in the adjusting plate 113 rotates in one direction, the adjusting bolt 117 descends from the adjusting hole 113H of the adjusting plate 113, such that an inner diameter of the adjusting hole 113H increases. As a result, the adjusting plate 113 ascends by a predetermined distance along the inclined surface of the upper portion of the plate 111 by the bearing 116 provided in one end of the adjusting plate 113.

In addition, when the adjusting bolt 117 provided in the adjusting plate 113 rotates in the other direction, the adjusting bolt 117 ascends from the adjusting hole 113H of the adjusting plate 113, such that an inner diameter of the adjusting hole 113H is restored to an original size. As a result, the adjusting plate 113 descends by a predetermined distance along the inclined surface of the upper portion of the plate 111 to return to an original portion.

As described above, in various embodiments of the present invention, the adjusting plate 113 ascends and descends by the adjusting bolt 117 provided in the adjusting plate 113, thereby making it possible to adjust the position of the segment 121 provided on the adjusting plate 113.

Meanwhile, in various embodiments, it may be preferable that the plate 111 has a first support 118 provided on an upper portion of the center thereof, the adjusting plate 113 has a second support 119 provided on a lower portion of the center thereof, and the first and second supports 118 and 119 have a bearing 110B additionally provided therebetween, thereby facilitating movement of the adjusting plate 113 when the adjusting plate 113 ascends and descends by the adjusting bolt 117.

In various embodiments, it may be preferable that the first support 118 has a triangular shape and the second support 119 has an inverted triangular shape, such that inclined surfaces corresponding to each other are formed between the first and second supports 118 and 119, and the inclined surfaces formed between the first and second supports 118 and 119 are formed in the same direction as that of the inclined surface formed on the adjusting plate 113.

As described above, in various embodiments of the present invention, the adjusting plate 113 on which the segments 121 are mounted is provided on the plate 111 so as to ascend and descend, and the adjusting plate 113 moves upwardly or downwardly along the inclined surface of the plate 111 by the adjusting bolt 117 provided in the adjusting plate 113, thereby making it possible to adjust the position of the segment 121.

As a result, according to various embodiments of the present invention, since the position of the segment 121 may be adjusted from the plate 111 through ascent and descent of the adjusting plate 113, a time required for separating the segment 121 from the plate 111 at the time of adjusting the segment 121 may be decreased as compared with a turn broach device according to the related art. Therefore, inconvenient work such as separation and reassembling between the segment 121 and the plate 111 may be prevented and the segment 121 may finely move by the serration 111a formed on the adjusting plate 113 and the segment 121, thereby improving work accuracy.

As set forth above, according to various embodiments of the present invention, at the time of adjusting a position of the segment for the plate, the segment does not manually move, but moves on the adjusting plate that is mechanically defined, such that work accuracy may be improved to increase marketability and a work time may be decreased to improve work convenience and productivity.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turn broach machine comprising:
a machining member for cutting material from a workpiece; and
an adapter being disposed under the machining member and supporting the machining member, wherein the adapter adjusts a position of the machining member such that an adjusting plate moves along a plate,
wherein the adapter includes the plate supporting the machining member; and
an adjusting part being provided on the plate, the adjusting part including:
the adjusting plate being provided on the plate, and
a stopper being provided on the plate and limiting movement of the machining member.

2. The turn broach machine according to claim 1, wherein the machining member includes:
segments provided on the adjusting plate of the adjusting part; and
inserts provided on the segments configured for cutting material from the workpiece.

3. The turn broach machine according to claim 2, wherein the machining member further includes insert cores inserted between the segments and the inserts, wherein the insert cores allow adjusting the relative positions of the inserts.

4. The turn broach machine according to claim 2, wherein the machining member further includes cartridges mounting the inserts on the segments.

5. The turn broach machine according to claim 2, wherein the adjusting plate of the plate has a serration formed on an upper surface thereof.

6. The turn broach machine according to claim 5, wherein a lower portion of the segment has a shape corresponding to that of the serration formed on the upper surface of the adjusting plate of the plate.

7. The turn broach machine according to claim 2, wherein the segments are coupled to an upper portion of the adjusting plate by fixing bolts.

8. The turn broach machine according to claim 1, wherein one end of the adjusting plate is supported by a bearing along the plate and an other end of the adjusting plate is provided with an adjusting bolt to adjust the relative position of the adjusting plate with respect to the plate.

9. The turn broach machine according to claim 8, wherein the other end of the adjusting plate is provided with an adjusting hole having a screw thread formed on an inner peripheral surface thereof to allow the adjusting bolt to be threaded therein so as to ascend and descend with respect to the plate.

10. The turn broach machine according to claim 8, wherein the adjusting plate has a trapezoidal shape in which a lower surface thereof is short.

11. The turn broach machine according to claim 10, wherein inclined surfaces corresponding to each other are formed between the first and second supports and are formed in the same direction as that of the inclined surface formed on one end of the adjusting plate.

12. The turn broach machine according to claim 8, wherein the plate has a first support provided on an upper portion of the center thereof, the adjusting plate has a second support provided on a lower portion of the center thereof, and the first and second supports have a bearing additionally provided therebetween.

* * * * *